US010422658B2

(12) United States Patent
Steinhardt (10) Patent No.: US 10,422,658 B2
(45) Date of Patent: Sep. 24, 2019

(54) METHOD, FUSION FILTER, AND SYSTEM FOR FUSING SENSOR SIGNALS WITH DIFFERENT TEMPORAL SIGNAL OUTPUT DELAYS INTO A FUSION DATA SET

(71) Applicant: Continental Teves AG & Co. oHG, Frankfurt (DE)

(72) Inventor: Nico Steinhardt, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 263 days.

(21) Appl. No.: 14/917,063

(22) PCT Filed: Nov. 19, 2014

(86) PCT No.: PCT/EP2014/075060
§ 371 (c)(1),
(2) Date: Mar. 7, 2016

(87) PCT Pub. No.: WO2015/075093
PCT Pub. Date: May 28, 2015

(65) Prior Publication Data
US 2016/0209236 A1 Jul. 21, 2016

(30) Foreign Application Priority Data
Nov. 20, 2013 (DE) .......................... 10 2013 223 629

(51) Int. Cl.
*G01C 25/00* (2006.01)
*G01C 21/16* (2006.01)

(52) U.S. Cl.
CPC ......... *G01C 25/005* (2013.01); *G01C 21/165* (2013.01)

(58) Field of Classification Search
CPC ..... G01C 25/005; G01C 21/165; G01S 19/49; G01S 19/28; G01D 1/00; G06F 17/18
(Continued)

(56) References Cited

U.S. PATENT DOCUMENTS

2005/0251328 A1 11/2005 Merwe
2011/0161032 A1* 6/2011 Stahlin ................... G01C 21/30
702/94
(Continued)

FOREIGN PATENT DOCUMENTS

DE 102010063984 8/2011
DE 102012216215 3/2013
(Continued)

OTHER PUBLICATIONS

Fletcher, et al. "Real-Time Fusion of Image and Intertial Sensors for Navigation", ION 63rd Annual Meeting, Apr. 25 2007, Massachusetts, pp. 534-544.
(Continued)

*Primary Examiner* — Mouloucoulaye Inoussa
(74) *Attorney, Agent, or Firm* — RatnerPrestia (57) ABSTRACT

A method, a system, and a use of the system, for fusing sensor signals with different temporal signal output delays into a fusion data set. Each of at least three different sensor signals describe a measured value of at least three different sensor systems. The signal output delays are unique to the sensor. Each sensor signal includes a timestamp describing a detection time of the measured value. Erroneous measured values of a first sensor system are determined by a comparison with the measured values of other sensor systems. The erroneous values are considered constant at least for the duration between two consecutive comparisons. The erroneous values and/or the measured values are available for a specified time. The erroneous values and/or the measured (Continued)

values of the first sensor system constant are corrected by a correction process, and corrections carried out during the time period are considered when applying additional corrections.

17 Claims, 3 Drawing Sheets

(58) Field of Classification Search
USPC ......... 701/409; 342/357.67, 357.41; 702/150
See application file for complete search history.

(56) References Cited

U.S. PATENT DOCUMENTS

| | | |
|---|---|---|
| 2012/0303176 A1 | 11/2012 | Wong et al. |
| 2012/0303221 A1 | 11/2012 | Gunthner |
| 2014/0320310 A1* | 10/2014 | Steinhardt ............ G01C 21/165 340/870.07 |
| 2014/0371990 A1 | 12/2014 | Steinhardt |

FOREIGN PATENT DOCUMENTS

| | | |
|---|---|---|
| WO | 2012161597 | 11/2012 |
| WO | 2013166093 A1 | 11/2013 |

OTHER PUBLICATIONS

International Search Report for International Application No. PCT/EP2014/075060 dated Apr. 10, 2015.
Written Opinion of the International Searching Authority for International Application No. PCT/EP2014/075060 dated Apr. 10, 2015.
McMillan, J.C., et al., "Sensor integration options for low cost position and attitude determination," Position Location and Navigation Symposium, 1994, IEEE, Las Vegas, NV, Apr. 11-15, 1994, pp. 453-459, (Abstract only).
Wikipedia Contributors, "Kalman filter," Wikipedia, The Free Encyclopedia, Nov. 13, 2013, 30 pages.
Hong, Z., et al., "Research on multi-sensor fusion of underwater robot navigation system," Proceedings of the 2009 IEEE International Conference on Robotics and Biometrics, Dec. 19-23, 2009, pp. 1327-1330 (Abstract only).
German Search Report for German Application No. 10 2014 211 166.8, dated Feb. 22, 2018, including partial English translation, 12 pages.

* cited by examiner

METHOD, FUSION FILTER, AND SYSTEM FOR FUSING SENSOR SIGNALS WITH DIFFERENT TEMPORAL SIGNAL OUTPUT DELAYS INTO A FUSION DATA SET

CROSS REFERENCE TO RELATED APPLICATIONS

This application is the U.S. National Phase Applications of PCT International Application No. PCT/EP2014/075060, filed Nov. 19, 2014, which claims priority to German Patent Application No. 10 2013 223 629.8, filed Nov. 20, 2013, the contents of such Applications being incorporated by reference herein.

FIELD OF THE INVENTION

The invention relates to a method for fusing sensor signals with different temporal signal output delays into a fusion data set, a fusion filter for fusing sensor signals with different temporal signal output delays into a fusion data set, a system for fusing sensor signals with different temporal signal output delays into a fusion data set, and a use of the system.

BACKGROUND OF THE INVENTION

All measured data are in principle errored and in many cases the measured data are not continuously available. In addition, the measured data are frequently dependent on environmental conditions. Furthermore, different sensors or sensor systems generally have different temporal acquisition rates, are not synchronized with other sensors or sensor systems and have a latency time between the measurement and the output of the measured values. Sensor errors or measurement errors or errored measured values can be subdivided into quasi-stationary components that are constant over a plurality of measurements, such as e.g. an offset, and stochastic components that are random from measurement to measurement, such as e.g. noise. Whereas the random components are in principle not deterministically correctable, quasi-stationary errors can generally be corrected provided that they are observable. Non-correctable, significant errors can normally be at least avoided provided that they are recognizable.

In the prior art, different sensor fusion methods are already known which are normally also suitable for correcting or filtering measured data from different sensors or sensor systems. Particularly in the automotive sector, special requirements must be taken into account since a multiplicity of different sensors monitor a common environmental situation or a motor vehicle state by means of different measuring principles and describe this environmental situation or this motor vehicle state by means of a multiplicity of different measured data. The greatest possible resilience to random interference and a recognition and compensation of systematic errors are thus required for a sensor fusion applicable in the automotive sector. Similarly, temporal influences on the measured data must be corrected and temporary outages or the unavailability of sensors must be bridged.

In this context, DE 10 2010 063 984 A1, which is incorporated by reference describes a sensor system comprising a plurality of sensor elements. The sensor elements are designed so that they at least partially monitor different primary measured quantities and at least partially use different measuring principles. At least one measured quantity is then derived from at least one primary measured quantity of one or more sensor elements. Furthermore, the sensor system comprises a signal processing device, an interface device and a plurality of functional devices. The sensor elements and all functional devices are connected to the signal processing device, wherein the signal processing device is designed so that it in each case comprises at least one of the following signal processing functions for at least one of the sensor elements or its output signals:

an error handling,
a filtering, and
a calculation or provision of a derived measured quantity.

The signal processing device makes the signal processing functions available to the functional devices.

DE 10 2012 216 215 A1, which is incorporated by reference similarly describes a sensor system which comprises a plurality of sensor elements and a signal processing device. The signal processing device is designed so that it at least partially jointly evaluates the sensor signals of the sensor elements. The signal processing device is furthermore designed so that time information directly or indirectly comprising information relating to the time of the respective measurement is allocated in each case to the measured data of physical quantities, wherein the signal processing device takes account of this time information at least in the generation of a fusion data set in a fusion filter. For the generation of the fusion data set, measured data having either matching time information or, if no measured data with matching time information are present, a corresponding measured value is created with the required time information by means of interpolation. Furthermore, the fusion filter assumes that error values of the measured data change only negligibly over a defined time period.

However, the generic methods and sensor systems known in the prior art have disadvantages for a plurality of reasons. Thus, insofar as acausal methods are involved, they have no real-time capability, since they perform calculations on available data sets several times and in different sequences. Conversely, other methods provide a real-time capability, but only with a processing overhead that is unacceptably high in series production, since a backward calculation to the measurement time is carried out on receipt of a measured value which is naturally delayed in order to then perform a forward calculation once more to the actual time. Furthermore, methods of this type provide only a comparatively small gain in terms of the accuracy of the processed measured values. Other known methods in turn suffer from their latency time burden, since they always undertake a fusion of the acquired measured data only when the sensor with the longest delay time has transmitted its measured data. Since, for example, a conventional GPS receiver has a delay time of some 100 ms, this produces a corresponding latency of the system as a whole. Further weaknesses of the known methods are e.g. the often applied processing-requirement-reducing principles based on preconditions that are unsuitable for heterogeneous sensor measurements, such as, for example, the assumption that no measurements of other sensors are fused during the delay time.

SUMMARY OF THE INVENTION

One aspect of the invention therefore proposes a real-time-capable method for fusing sensor signals while avoiding the aforementioned disadvantages.

An aspect of the invention relates to a method for fusing sensor signals with different temporal signal output delays into a fusion data set, wherein at least three different sensor signals in each case describe a measured value of at least three different sensor systems, wherein the signal output delays are individual to each sensor, wherein the sensor signals in each case comprise a timestamp describing an acquisition time of the measured values, wherein error values of measured values of a first sensor system are defined by means of a comparison with measured values of further sensor systems, wherein measured values with an identical timestamp are used for the comparison, wherein the error values are assumed as constant at least for the time period between two consecutive comparisons, wherein the error values and/or the measured values of the first sensor system are retained for a specified time period, wherein the error values and/or the measured values of the first sensor system are continuously corrected by means of a correction, and wherein corrections carried out during the time period are taken into account in an application of further corrections during the time period.

An aspect of the invention thus describes a comparatively very reliable and precise and above all real-time-capable and flexible method for fusing sensor signals. The at least three different sensor systems can have signal output delays individual to each sensor, as a result of which the fusion of virtually any sensor signals is possible. The assumption that the error values are constant for the time period between two consecutive comparisons allows the specific error values to be corrected for the entire time period by means of one and the same correction. The permissibility of this assumption is based on the realization that, although the measured values may change comparatively quickly, the error values of the measured values normally change only comparatively slowly.

One particular advantage of the method according to an aspect of the invention lies in the fact that specific corrections are in each case taken into account once only from the measured values of the further sensor systems in the specified time period. Therefore, if, for example, a correction of the measured values of the first sensor system resulting from the measured values of the one sensor system takes place and a further correction from the measured values of a further sensor system is to take place in the continuing performance of the method during the specified time period, the further correction does not take place if it would only repeat the preceding correction once more. If the further correction were to repeat the preceding correction proportionally once more, the further correction does not take place proportionally to the extent that it would repeat the preceding correction. However, if it contradicts or supplements the preceding correction, it is carried out. An unnecessary additional correction which would once more distort the already corrected measured values can thus be avoided.

The error values and measured values are deleted from a memory suitable for this purpose on expiry of the specified time period and are replaced by current error values and measured values.

The method according to an aspect of the invention is particularly suitable for fusion filters which estimate error increments. The invention is based on the realization that the change rate of sensor errors is significantly less than the change rate of the error values of acquired measured values and that the change rate of the sensor errors is furthermore independent from the operating point of the sensor systems.

According to an aspect of the invention, the term "redundant corrections" is therefore understood to mean not only completely identical corrections, but also only partially identical and overlapping corrections. In other words, the corrections already carried out are taken into account or offset according to the invention in the application or performance of further corrections which are based on the measured values of a sensor with a longer signal transit delay time.

As described, a specified time period is therefore defined according to the invention during which the sensor signals or the error values of the measured values of the measured values of the first sensor system are retained and the assumption is made that the associated error values are constant. Corrections then relate equally to all retained measured values or error values. Compared with the prior art, this results in the improvement that a plurality of different sensor systems are usable with different, non-constant delay times for correction measurements.

The specified time period is particularly preferably 25 measuring epochs, wherein a measuring epoch is the time period between the output of two sensor signals of the sensor system with the shortest output delay. In general, however, it is appropriate to select the specified time period depending on the respective system dynamics.

It is furthermore provided according to an aspect of the invention that variances are assigned to the error values or the measured values. The quality of the measured values and the error values can be comparatively simply and efficiently described by means of the variances. The variances are also preferably retained in the electronic data memory.

The timestamps are advantageously generated directly by the respective sensor systems and are written to the sensor signal describing the respective measured value, wherein the different sensor systems are preferably synchronized in this case with an external timer in order to avoid inaccuracies or deviations in the generation of the timestamp.

Alternatively, it is possible for the timestamp to be assigned to the respective sensor signal only by a receiver of the sensor signal, insofar as the receiver knows the signal output delay and, in particular, a transit delay of the sensor signal from the corresponding sensor system to the receiver of the sensor signal. For example, the signal output delays can be defined and stored before the method is carried out or before a system suitable for carrying out the method is put into operation. This offers the advantage that the timestamps always indicate the actual time of acquisition of a measured value. This allows an appropriate temporal assignment of the measured values of different sensors to one another.

It is furthermore preferred that the sensor signals of the different sensor systems at least indirectly describe one and the same state, e.g. a position of a motor vehicle.

The specified time period preferably corresponds at least to the temporal difference between the shortest signal output delay and the longest signal output delay, since the measured values of the sensor system with the shortest signal output delays can then be compared with the measured values of all other sensor systems, i.e. the measured values of the sensor system with the shortest signal output delays can be compared with the measured values of all other sensor systems.

The sensor system with the shortest signal output delay is preferably also referred to as the basic system, whereas the sensor systems with the non-shortest signal output delay are also referred to as the correction systems.

Alternatively, the selection of the basic system can also be made dependent on the type of the further processing of the sensor signals or measured values, e.g. by a filter. In this case, one of the sensor systems with the non-shortest signal output delay can therefore also be used as the basic system.

It is furthermore advantageous if the basic system is selected in such a way that all required information, e.g. navigation information, can be defined by the basic system alone.

The basic system is generally the sensor system whose error values are defined by means of the comparison with the further sensor systems or whose measured values are corrected. The further sensor systems are therefore also referred to as correction systems.

The assumption made for the method according to an aspect of the invention that only a negligible change in the error values takes place within the time period between two consecutive comparisons and that the error values are constant justifies the application of the corrections calculated according to the invention not only to the currently output measured values, but also to stored measured values of the sensor system with the shortest signal output delay. It is thus ensured that the comparison between the measured values always supplies the error value of the current state of the first sensor system even if stored measured values from the past are used, and is therefore also consistent with a weighting model that is used. The invention thus improves a multi-sensor capability of a fusion filter.

It is preferred that the first sensor system has a comparatively shortest signal output delay. Since the error values of the measured values of the sensor system with the shortest signal output delays are thus defined, are corrected and these error values are furthermore assumed as constant over the specified time period, comparatively current—since they are affected by the comparatively shortest signal output delays only—and corrected measured values are thus always available.

It is preferably provided that the retained error values or the retained measured values are corrected. This offers the advantage that an active monitoring or an active comparison of the performed corrections can be avoided, i.e. the corrections currently to be applied do not therefore have to be continuously compared with the corrections already applied in the past. Instead, the measured values from the past for defining the error values, i.e. for the comparison, and already corrected are in each case corrected as required by means of a further correction. An application of the correction to the retained error values produces the same effect, since the error values naturally describe only a deviation of a measured value from an actual value. When new measured values of the further sensor systems are present, new error values are then defined by means of a new comparison, wherein the already corrected, retained measured values or error values of the first sensor system are therefore used for the comparison. The recent correction thus takes place only if and only insofar as the already corrected retained measured values still have error values. This effectively prevents redundant corrections from taking place multiple times and resulting in the generation of new errors. The corrections may have the form of offset values which, in order to correct the error values, are added to the latter or to the measured values.

It is similarly preferably provided that the corrections are offset against one another. It is thus not necessary to correct the retained measured values or error values from the past. Instead the last applied correction, where relevant also a plurality of applied corrections, are in each case retained and compared with a new correction to be applied. Insofar and to the extent that the already performed correction already anticipates the new correction, i.e. corresponds to the latter, it is omitted. It is thus also guaranteed that the previously performed corrections are taken into account or redundant corrections are carried out once only.

It is furthermore preferred that the corrections are carried out by means of measured values of the further sensor systems. As already described, the error values of the measured values of the first sensor system are defined by means of a comparison with the measured values of the further sensor systems. It is equally appropriate to define the correction in the same way, since the correction is correlated in a fixed manner with the error values, since it ultimately compensates for or corrects said error values. In the presence of a known error value, the necessary correction can also be defined from it, since the correction preferably corresponds to the negative error value.

It is furthermore preferred that the sensor signals are filtered before being used for the fusion. It is thus guaranteed that roughly incorrect measured values are not processed, particularly not in the context of the comparison for defining the error values or for the correction. The filtering may be e.g. a statistical method, by means of which outliers among the measured values are recognized and rejected, or a prediction model which recognizes and rejects measured values which deviate by more than a threshold value from a model prediction.

Since the error values are assumed as constant over the time period, a number of measured values depending on the time period is therefore retained in the electronic data memory. Under the aforementioned assumption that the error values are constant over the time period, the measured values that are acquired or the sensor signals that are output within the time period can be split into actual operating points, i.e. into at least partially corrected measured values, and into residual errors independent therefrom. The independent residual errors can never be finally resolved, since the correction values used to define the error values are also errored. The operating points, on the other hand, can be defined at any time during an output of sensor signals of a sensor system with an output delay shorter than the longest output delay.

It is appropriate that the sensor signals are sensor signals of an inertial navigation system, sensor signals of a global satellite navigation system and sensor signals of an odometry navigation system. The present invention is thus suitable in particular for navigation purposes and for navigation systems, preferably in motor vehicles. The method according to the invention thus defines the position, in particular the position of a motor vehicle, from the sensor signals. The global satellite navigation system may, for example, be a GPS navigation system. The odometry navigation system initially defines the speed, e.g. via the known rolling circumference of the motor vehicle tires and from this the position, taking account of the steering angle. It is particularly appropriate that the satellite navigation system comprises at least two satellite signal receivers. As a result, it improves the quality of the acquired satellite signals and therefore the reliability and accuracy of the satellite navigation system. The temporal signal output delays of the aforementioned sensor signals are typically arranged in the following, ascending order: sensor signals of the inertial navigation system, sensor signals of the odometry navigation system and sensor signals of the global satellite navigation system.

It is advantageous that the error values are defined by means of an error state space filter, in particular by means of an error state space Kalman filter. The error state space filter represents a fusion filter for the fusion of the measured values, in particular for the fusion of normally distributed measured values. Preferably, the error state space filter simultaneously estimates or defines the error values of the first sensor system. The first sensor system is preferably an inertial navigation system of a motor vehicle. The error values and, where relevant, also unknown quantities of the inertial navigation system can then be estimated or defined by means of the further sensor systems. A particular feature of the error state space filter is therefore that, instead of the sensor signals or the measured values, only error values are incrementally estimated or defined and the measured values are then corrected by means of the corrections. The error values have significantly lower temporal dynamics than the measured values themselves, as a result of which an extensive decoupling of the dynamics of the error state space filter from the sensor characteristics is achieved and additional delays or errors due to non-constant group delays of the individual signals of a signal packet are reduced.

A further special feature of the error state space Kalman filter is that, through the application of a correction, the estimated or defined error values are zero following each duty cycle of the error state space Kalman filter, as a result of which an otherwise usual prediction step for predicting the error values in the following duty cycle is no longer required, whereby the processing overhead for the error state space Kalman filter is therefore reduced.

The requirements of the different applications, in particular the different vehicle system applications, with regard to the quality of the fused measured data are in each case specific. For the desired use of the fusion as the central data supplier for all applications, the most demanding requirement for a characteristic or, in the case of conflicting requirements, the best compromise of the characteristics, is the deciding factor. However, generally applicable requirements for the fusion are normally the shortest possible latency time, a constant, shortest possible group delay and high availability and freedom from conflict of the data.

Instead of the prediction step often customary in the prior art, the measured values of the first sensor system already continuously corrected in the past are differentiated from the measured values of other further sensor systems used for the correction. This difference forms the basis for the estimation or definition of the current error values and represents, for example, a possibility for the comparison according to the invention.

If no correction values are available in a duty cycle of the error state space Kalman filter, no definition of new error values takes place either, and the respectively current sensor signals of the sensor with the shortest signal output delay are further processed with the last known error values or correction values. An independence from the availability of correction measurements is thus provided for the time period for which the error values of the first sensor system are assumed as constant. In this case, only the propagation of the variances is carried out in the error state space Kalman filter.

It is particularly preferably provided that measured values are generated with a required timestamp by means of interpolation for the definition of the error values if no measured values with an identical timestamp are present. Since the sensor signals normally have timestamps that differ from one another due to the different signal output delays and generally due to the lacking synchronization of the sensor systems, a measured value with the required timestamp can be calculated by means of the interpolation. Measured values of the first sensor system which, particularly preferably, has the shortest signal output delay are preferably generated by means of interpolation, i.e. these measured values are therefore generated depending on the timestamps of the measured values or sensor signals of the further sensor systems. The two measured values of the first sensor system closest to and including the measured value to be generated with the required timestamp are appropriately used for the generation of a measured value by means of interpolation. The measured value generated by means of interpolation is then used to define the error values.

The required timestamp is the identical timestamp.

It is furthermore particularly preferably provided that changes in the measured values for the interpolation are assumed as proportional to time. A linear interpolation is thus carried out. This offers the advantage that the interpolation is comparatively simple and can be carried out accordingly with only a low processing overhead.

It is similarly preferably provided that the error values are defined for the measured values of all sensor systems. In particular, it is preferred to define the error values of the inertial navigation system by means of the measured values of the satellite navigation system and the measured values of the odometry navigation system and to correct the measured values of the inertial navigation system by means of the measured values of the satellite navigation system and the measured values of the odometry navigation system. It is furthermore particularly preferred to define the error values of the odometry navigation system by means of measured values of the inertial navigation system and to correct measured values of the odometry navigation system by means of measured values of the inertial navigation system. Similarly, it is furthermore particularly preferred to define the error values of the satellite navigation system by means of measured values of the inertial navigation system and to correct measured values of the satellite navigation system by means of measured values of the inertial navigation system. This type of mutual definition of error values and mutual correction of measured values is preferably carried out as "deep integration", which means that not only are the error values of the basic system defined and the measured values of the basic system corrected, but also, as described, those of the other sensor systems. The "deep integration" furthermore already comprises a correction of the respective raw sensor data of the different sensor systems, which improves a sensor signal preprocessing of the respective sensor systems. In addition, the "deep integration" also comprises a correction of the sensor systems as such, i.e. sensor systems which acquire errored measured values are already corrected as far as possible in the acquisition.

Since the inertial navigation system normally has the shortest signal output delays, i.e. represents the sensor system with the shortest signal output delays, it is advantageous to use its measured values for the position definition and correct them regularly by means of the measured values of the global satellite navigation system and the measured values of the odometry navigation system. In this case, the inertial navigation system forms the basic system, whereas the global satellite navigation system and the odometry navigation system form the correction systems.

The invention furthermore relates to a fusion filter for fusing sensor signals with different temporal signal output delays into a fusion data set, wherein the fusion filter is designed to acquire at least three sensor signals from at least three different sensor systems in each case describing a different measured value, wherein the signal output delays are individual to each sensor, wherein the sensor signals in each case comprise a timestamp describing an acquisition time of the measured values, wherein the fusion filter is designed to define error values of measured values of a sensor system with the shortest signal output delays by means of a comparison with measured values from other sensor systems, wherein the fusion filter is designed to use measured values with an identical timestamp for the comparison, wherein the fusion filter is designed to assume the error values as constant at least for the time period between two consecutive comparisons, wherein the fusion filter is designed to retain the error values and/or the measured values of the first sensor system for a specified time period, wherein the fusion filter is designed to correct the error values and/or the measured values of the first sensor system continuously by means of a correction, and wherein the fusion filter is designed to take account of corrections carried out during the time period in an application of further corrections during the time period. Since the filter according to the invention is therefore designed to carry out the method according to the invention, and in particular also carries out said method, it results, in conjunction with the aforementioned sensors, in the advantages already described.

It is preferably provided that the filter according to an aspect of the invention is designed as an error state space Kalman filter. An error state space Kalman filter enables the advantages already described in terms of the definition of the error values.

An aspect of the invention furthermore relates to a system for fusing sensor signals with different temporal signal output delays into a fusion data set, comprising at least three different sensor systems which output sensor signals describing measured data with signal output delays individual to each sensor, wherein the system furthermore comprises a fusion filter according to the invention. The system according to the invention therefore enables the method according to the invention to be carried out using the filter according to the invention. This results in the aforementioned advantages.

It is preferred that the system is designed to carry out the method according to the invention. The carrying out of the method according to the invention results in the advantages already described.

In order to standardize the architecture of a system of this type, it is provided to design the fusion of the sensor signals as a non-transparent processing level between the sensor systems and applications based on the measured values.

The invention furthermore relates to a use of the system according to the invention in a motor vehicle.

BRIEF DESCRIPTION OF THE DRAWINGS

Further preferred embodiments can be found in the subclaims and in the following description of an example embodiment with reference to figures, in which:

DETAILED DESCRIPTION OF THE PREFERRED EMBODIMENTS

Figure 1:
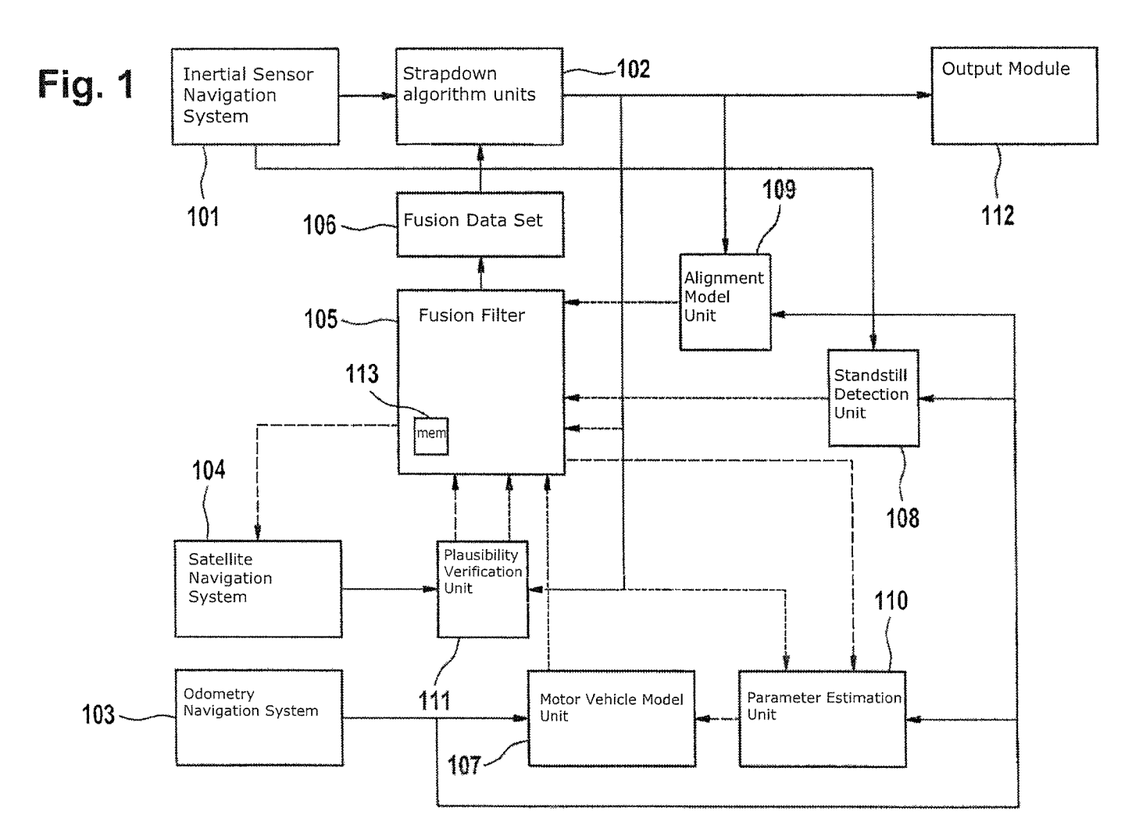
FIG. 1 shows an example of a possible embodiment of a system according to the invention which is designed for position definition, in a motor vehicle.

FIG. 1 shows, in schematic representation, an example embodiment of the system according to an aspect of the invention which is provided for arrangement and use in a motor vehicle (not shown). According to the example, the system shown is designed for position definition of the motor vehicle. All elements and components and sensor systems comprised by the system are illustrated as function blocks and their interaction with one another is shown.

The system comprises an inertial sensor navigation system 101 which is designed in such a way that it can measure at least the accelerations along a first, a second and a third axis and at least the rotational speeds around the first, around the second and around the third axis. The first axis corresponds, for example, to the longitudinal axis of the motor vehicle, the second axis corresponds to the transverse axis of the motor vehicle and the third axis corresponds to the vertical axis of the motor vehicle. These three axes form a Cartesian coordinate system, referred to as the motor vehicle coordinate system. According to the example, the inertial sensor navigation system 101 comprises only the sensor system necessary for measuring the accelerations and rotational speeds. According to the example, an electronic system required to process and evaluate the sensor signals is not comprised by the inertial sensor navigation system 101.

According to the example, the inertial sensor navigation system 101, together with further strapdown algorithm units 102 described below, forms the basic system, the measured values of which are corrected by means of the correction systems described below.

The system furthermore has a strapdown algorithm unit 102 in which a strapdown algorithm is run, by means of which the measured values of the inertial sensor navigation system 101 are converted, inter alia, into speed data and position data. To do this, the sensor signals of the inertial sensor navigation system 101 which naturally describe accelerations are integrated once or twice over time. An alignment of the motor vehicle is also defined by means of one-off integration of corresponding sensor signals of the inertial sensor navigation system 101 over time. Furthermore, the strapdown algorithm unit 102 compensates for a Coriolis acceleration acting on the inertial sensor navigation system 101 and the gravity acceleration, referred to as the earth transport rate and the earth rate.

The output data of the strapdown algorithm unit 102 consequently comprise the following physical quantities: the speed, the acceleration and the rotational speed of the motor vehicle, according to the example in relation to the aforementioned three axes of the motor vehicle coordinate system and, according to the example, additionally in each case with reference to a world coordinate system that is suitable for describing the alignment or dynamic quantities of the motor vehicle in the world. According to the example, the aforementioned world coordinate system is a GPS coordinate system. Furthermore, the output data of the strapdown algorithm unit 102 comprise the position in relation to the motor vehicle coordinate system and the alignment in relation to the world coordinate system. The aforementioned physical quantities calculated by the strapdown algorithm unit 102 are output via the output module 112 and are made available to other motor vehicle systems.

The system furthermore comprises an odometry navigation system 103 in the form of wheel rotational speed sensors for each wheel of the motor vehicle. According to the example, this involves a four-wheel motor vehicle with four wheel rotational speed sensors which in each case measure the speed of the wheel assigned to them and its direction of rotation. The odometry navigation system 103 furthermore comprises a steering angle sensor element which measures the steering angle of the motor vehicle.

In addition, the system shown by way of example has a satellite navigation system 104 which is designed so that it defines the distance in each case between an assigned satellite and the motor vehicle and the speed in each case between the assigned satellite and the motor vehicle. In addition, according to the example, the satellite navigation system 104 supplies the fusion filter 105 with a start position or start position information, at least at the start or on activation of the system.

The system furthermore comprises a fusion filter 105. During the joint evaluation of the sensor signals of the odometry navigation system 103, of the satellite navigation system 104 and of the inertial sensor navigation system 101, the fusion filter 105 provides a fusion data set 106. According to the example, the fusion data set 106 comprises the error values and correction values for the different acquired measured values.

The sensor signals of the inertial navigation system 101 are then stored for a specified time period in the electronic data memory 113 of the fusion filter 105 provided for this purpose. Furthermore, an algorithm of the fusion filter 105 assumes that error values of the measured values of the inertial navigation system 101 are constant for a defined time period, according to the example for 250 ms. The inertial navigation system 101, together with the strapdown algorithm unit 102, represents the basic system, whereas the odometry navigation system 103 and the satellite navigation system 104 represent the correction systems. If required, i.e. if the stored measured values have no timestamp identical to the measured values of the correction systems, a measured value with the required timestamp is interpolated from the stored measured values. Conversely, the measured values of the correction systems, i.e. of the satellite navigation system 104 and of the odometry navigation system 103, are not stored.

It is thus ensured that the comparison between at least one correction system and the basic system, i.e. the definition of the error values, always supplies the error value of the current state of the basic system even if stored measured values from the past are used, and is therefore also consistent with the current weighting model of the algorithm. Corrections then relate equally to all stored measured values. The quality of the fusion data set 106 and also the quality of the correction for the basic system are thus improved. Since both the basic system compared with the correction systems and also the correction systems compared with one another have different delay times, the occurrence of comparatively greater inaccuracies can be avoided by the fusion filter 105 according to the invention with the electronic data memory 113.

According to the example, the fusion data set 106 provided by the fusion filter 105 comprises the error values of the measured values of the basic system which have been defined by means of the measured values of the correction systems. The error values of the measured values of the basic system are continuously further defined as soon as new measured values of a correction system are present. In other words, this means that new corrections are continuously defined.

The strapdown algorithm unit 102 then corrects the measured values of the basic system by means of the fusion data set 106.

The fusion data set 106 is calculated by the fusion filter 105 from the measured values or sensor signals from the odometry navigation system 103, the satellite navigation system 104 and the inertial navigation system 101.

According to the example, the fusion filter 105 is designed as an error state space Kalman filter, i.e. as a Kalman filter which comprises, in particular, a linearization of the measured values and in which the error values are calculated or estimated and which operates sequentially and uses or takes into account the sensor signals or measured values available in the respective function step of the sequence.

The fusion filter 105 is designed so that it acquires asynchronously the latest sensor signals or measured values output by the inertial navigation system 101, the odometry navigation system 103 and the satellite navigation system 104. According to the example, the measured values or sensor signals are routed via a motor vehicle model unit 107 and an alignment model unit 109.

The motor vehicle model unit 107 is designed so that it calculates, from the sensor signals of the odometry navigation system 103, at least the speed along a first axis, the speed along a second axis and the rotational speed around a third axis and supplies these to the fusion filter 105.

The motor vehicle model unit 107 is designed so that it calculates the speed of each wheel along the first and the second axis from the sensor signals of the wheel rotational speed sensor elements and the steering angle sensor. The motor vehicle model unit 107 furthermore calculates the rotational speed around the third axis.

The system furthermore comprises a tire parameter estimation unit 110 which is designed so that it calculates at least the radius, according to the example the dynamic radius, of all wheels and additionally calculates the cornering stiffness and slip stiffness of all tires and supplies these to the motor vehicle model unit 107 as additional input quantities. The tire parameter estimation unit 110 is furthermore designed so that it uses an essentially linear tire model to calculate the tire sizes. The input quantities of the tire parameter estimation unit 110 according to the example are the sensor signals describing the wheel rotational speeds and the steering angle, at least partially the output values of the strapdown algorithm unit 102 and the variances defined by the fusion filter 105.

The system furthermore comprises a GPS error detection and plausibility verification unit 111 which is designed so that, according to the example, it receives as input data the measured values or sensor signals of the satellite navigation system 104 and, at least partially, measured values or sensor signals from the strapdown algorithm unit 102 and takes them into account in its calculations. The GPS error detection and plausibility verification unit 111 furthermore checks the measured values or sensor signals against a stochastic model adapted to the specific and individual characteristics of the satellite navigation system 104. If the measured values or sensor signals correspond to the model in terms of a tolerance taking account of the noise, they are verified or confirmed.

The GPS error detection and plausibility verification unit 111 is additionally connected to the fusion filter 105 at data level and transmits the plausibility-verified measured values or sensor signals to the fusion filter 105.

The GPS error detection and plausibility verification unit 111 is designed, for example, so that it carries out a method for selecting a satellite, inter alia, by means of the following method steps:

measuring position data of the motor vehicle in relation to the satellite based on the sensor signals from the satellite navigation system 104, defining redundant reference position data of the motor vehicle for the position data defined on the basis of the sensor signals of the satellite navigation system 104, selecting the satellite if a comparison of the position data and the reference position data satisfies a predefined condition, wherein, for the comparison of the position data and the reference position data, a difference between the position data and the reference position data is formed, wherein the predefined condition is a maximum permissible deviation of the position data from the reference position data, wherein the maximum permissible deviation is dependent on a standard deviation which is calculated on the basis of a sum of a reference variance for the reference position data and a measured variance for the position data, and wherein the maximum permissible deviation corresponds to a multiple of the standard deviation in such a way that a probability that the position data fall in a distribution interval depending on the standard deviation falls below a predefined threshold value.

The aforementioned method steps are carried out according to the example using the raw data of the individual sensor systems.

The system furthermore has a standstill detection unit 108 which is designed so that it can detect a standstill of the motor vehicle and, in the case of a detected standstill of the motor vehicle, provides at least the fusion filter 105 with information from a standstill model. The information from a standstill model describes that the rotational speeds around all three axes have the value zero and the speeds along all three axes have the value zero. According to the example, the standstill detection unit 108 is designed so that it uses the sensor signals of the wheel rotational speed sensors from the odometry navigation system 103 and the sensor signals from the inertial navigation system 101 as input data.

According to the example, the system uses a first group of measured values or sensor signals which relate to a motor vehicle coordinate system and additionally a second group of measured values or sensor signals which relate to a world coordinate system, wherein the world coordinate system is used to describe the alignment and dynamic quantities of the motor vehicle. An alignment angle between the motor vehicle coordinate system and the world coordinate system is defined by means of the alignment model unit 109.

The alignment angle between the motor vehicle coordinate system and the world coordinate system defined by the alignment model unit 109 is defined on the basis of the following quantities:

the vectorial speed in relation to the world coordinate system, the vectorial speed in relation to the motor vehicle coordinate system, the steering angle, and the respective error values of the measured values describing the aforementioned quantities.

According to the example, the alignment model unit 109 uses all of the output data of the strapdown algorithm unit 102.

According to the example, the alignment model unit 109 is designed so that, in addition to the alignment angle, it also calculates information relating to the data quality of the alignment angle in the form of a variance and supplies this to the fusion filter 105.

The fusion filter further 105 uses the alignment angle and the variance of the alignment angle in its calculations, which it forwards via the fusion data set 106 to the strapdown algorithm unit 102.

The fusion filter 105 therefore stores the measured values received from the inertial navigation system 101, the basic system, for 250 ms in the electronic data memory 113. In each case, if the fusion filter 105 receives a measured value from the odometry navigation system 103 or from the satellite navigation system 104, the fusion filter 105 defines a respective current error value of the inertial navigation system 101 by means of a comparison of the measured value from the odometry navigation system 103 or from the satellite navigation system 104 with the measured values from the inertial navigation system 101. This error value is assumed as constant until a new error value has been defined. Measured values with an identical timestamp are always used for the comparison, i.e. stored measured values from the inertial navigation system 101 must be used due to the longer signal output delays of the odometry navigation system 103 and the satellite navigation system 104. However, if the timestamp of the stored measured values of the inertial navigation system 101 does not match the required timestamp, a measured value with the required timestamp is interpolated linearly by means of the stored measured values, i.e. a measured value which was seemingly acquired at the same time as the corresponding measured value from the odometry navigation system 103 or from the satellite navigation system 104 is generated by means of linear interpolation. The defined error values are then used by the fusion filter 105 to correct the current measured values of the inertial navigation system 101 by means of a correction. The stored measured values from the past are also simultaneously corrected so that the correction is taken into account in an application of further corrections during the 250 ms, since the measured values to be corrected by means of the further correction in fact already have the current correction.

Figure 2:
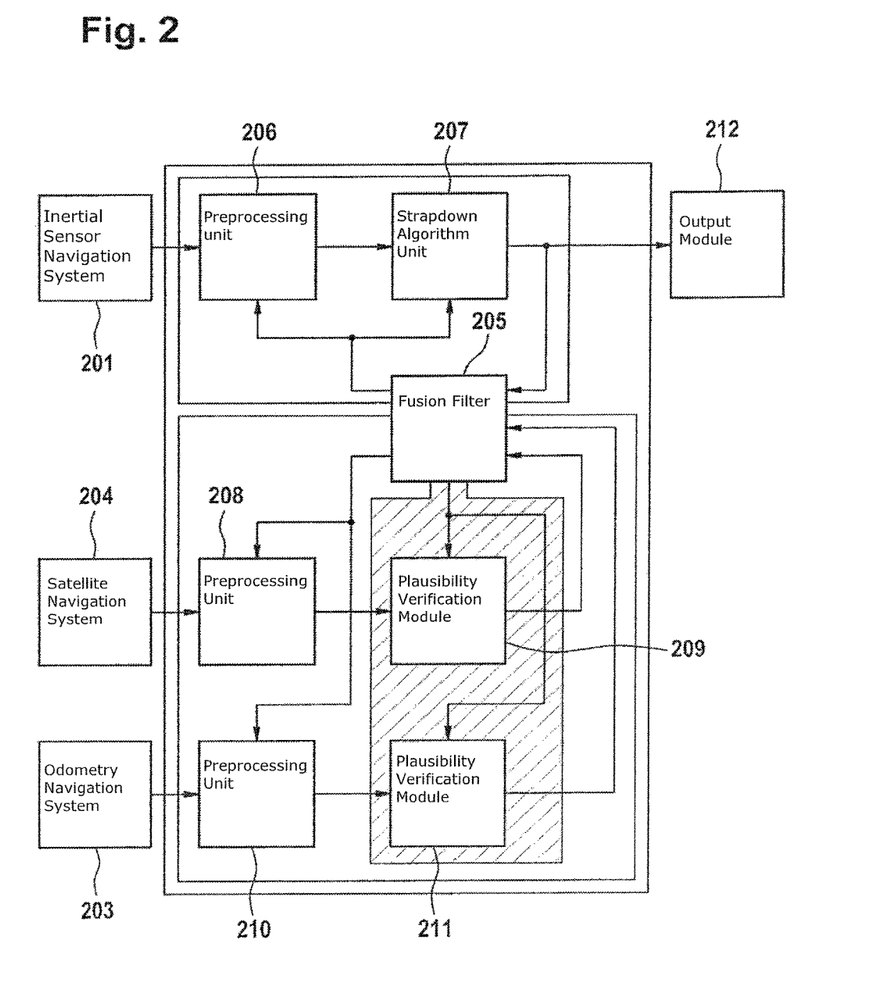
FIG. 2 shows an example of a further possible embodiment of a system according to the invention which is similarly designed for position definition, in a motor vehicle.

FIG. 2 shows by way of example a further possible embodiment of a system according to an aspect of the invention which is similarly designed for position definition, in a motor vehicle. The system comprises an inertial sensor navigation system 201, a satellite navigation system 204 and an odometry navigation system 203 as different sensor systems. The inertial sensor navigation system 201, the satellite navigation system 204 and the odometry navigation system 203 in each case have different and individual signal output delays, which means that the aforementioned sensor systems acquire a measured value at a first time, but output said value to a fusion filter 205 in the form of sensor signals only on expiry of a time period corresponding to the respective individual signal output delay. The sensor signals are output via a vehicle data bus, according to the example via a CAN bus. According to the example, the satellite navigation system 204 outputs its measured values or sensor signals in the form of raw data.

According to the example, the inertial sensor navigation system 201 has the shortest signal output delay, followed by the odometry navigation system 203 and finally by the satellite navigation system 204, which has the longest signal output delay.

The inertial navigation system 201 which, according to the example, is an MEMS-IMU (Micro-Electro-Mechanical System Inertial Measurement Unit), is therefore used as the central element in a position definition of the motor vehicle in combination with a strapdown algorithm unit 207, since said system supplies all measured values or sensor signals with the comparatively shortest signal output delays necessary for a complete dead reckoning and additionally has the highest availability more or less independent from the environment and vehicle states. Here, the most significant sensor errors are the offset and the scale factor error, wherein the initial values or summed error values of the alignment, speed and position quantities cannot initially be estimated without external support. The noise and the remaining, unmodelled errors of the inertial navigation system 201, such as e.g. non-linearity, are assumed as zero-mean, stationary and normally distributed over the measurement range (Gaussian white noise).

The inertial sensor navigation system 201 comprises three rotational speed sensors in each case sensing orthogonally in relation to one another and three acceleration sensors in each case sensing orthogonally in relation to one another. The satellite navigation system 204 comprises a GPS receiver which initially carries out distance measurements via the satellite signal transit delay for the receivable GPS satellites and furthermore defines a route traveled by the motor vehicle from the change in the satellite signal transit delay and additionally from the change in the number of wavelengths of the satellite signals between the transmitter antenna and the receiver antenna. The odometry navigation system 203 in each case comprises a wheel rotational speed sensor on each wheel of the motor vehicle and a steering angle sensor. The wheel rotational speed sensors in each case define the wheel rotational speed of the wheel assigned to them and the steering angle sensor defines the adopted steering angle.

The inertial sensor navigation system 201 outputs its measured values or sensor signals to a preprocessing unit 206 of the inertial sensor navigation system 201. The preprocessing unit 206 then corrects the measured values or sensor signals by means of correction values which the preprocessing unit 206 receives from the fusion filter 205. The measured values or sensor signals corrected in this way are then forwarded to the strapdown algorithm unit 207. Since, according to the example, the preprocessing unit 206, the strapdown algorithm unit 207 and the fusion filter 205 are software modules which are executed in different partitions on one and the same processor, the corrected measured values or sensor signals can be comparatively simply and quickly forwarded.

The strapdown algorithm unit 207 then carries out a position definition using the corrected measured values or sensor signals from the preprocessing unit 206. This position definition is a dead reckoning based on the inertial sensor navigation system 201. For this purpose, the corrected measured values or sensor signals output by the preprocessing unit 206 are continuously integrated or added over time. The strapdown algorithm unit 207 furthermore compensates for a Coriolis acceleration acting on the inertial sensor navigation system 201 and the gravity acceleration, referred to as the earth transport rate and the earth rate, which may in each case affect the measured values of the inertial sensor navigation system 201.

The system furthermore has a strapdown algorithm unit 207 in which a strapdown algorithm is run, by means of which the measured values from the inertial sensor navigation system 201 are converted, inter alia, into speed data and position data. To do this, the sensor signals from the inertial sensor navigation system 201, which naturally describe accelerations, are integrated twice over time. An alignment of the motor vehicle is also defined by means of one-off integration of the corresponding sensor signals, i.e. the rotational speeds, of the inertial sensor navigation system 101 over time. This enables an updating of a previously known alignment of the motor vehicle The strapdown algorithm unit 207 defines the position, the speed and the alignment by means of corrections of the fusion filter 205. In this example, the fusion filter 205 therefore carries out the correction only indirectly via the strapdown algorithm unit 207 defined and corrected information, i.e. the position, the speed, the acceleration, the alignment, the rotational speed and the rotational acceleration of the motor vehicle are then forwarded to an output module 212 and to the fusion filter 205.

The strapdown algorithm run by the strapdown algorithm unit 207 is arithmetically simple and can therefore be implemented as a real-time-capable basic system. It represents a method sequence for integrating the measured values from the inertial navigation system 201 for the speed, alignment and position and contains no filtering, resulting in a more or less constant latency time and group delay. According to the example, the calculation is carried out simultaneously with the output of the sensor signals by the inertial sensor navigation system 201.

According to the example, the inertial sensor navigation system 201, the preprocessing unit 206 of the inertial sensor navigation system 201 and the strapdown algorithm unit 207 together form the basic system which, in addition, proportionally includes the fusion filter 205 also.

The output module 212 forwards the information defined and corrected by the strapdown algorithm unit 207 to any given further systems of the motor vehicle.

According to the example, the measured values acquired by the satellite navigation system 204 are initially forwarded in the form of sensor signals via a UART data link to the preprocessing unit 208 of the satellite navigation system 204. The preprocessing unit 208 then corrects the measured values, which are GPS raw data, from the satellite navigation system 204, by means of error values and corrections received from the fusion filter 205, and furthermore calculates the orbit data of the GPS satellites from which GPS signals are received. The satellite navigation system 204 furthermore defines a relative speed of the motor vehicle in relation to those GPS satellites from which GPS signals are received. The preprocessing unit 208 furthermore corrects a time error, contained in the sensor signals, of a receiver clock of the satellite navigation system 204 which is caused by a drift of the receiver clock and also, by means of a correction model, changes in the signal transit delay and in the signal path caused by atmospheric effects on the GPS signals transmitted by the GPS satellites. The time error and the atmospheric effects are also corrected by means of corrections received from the fusion filter 205.

A plausibility verification module 209 which verifies the plausibility of information, according to the example the GPS raw data, output by the preprocessing unit 208 is furthermore assigned to the satellite navigation system 204. For the plausibility verification, it is assumed that the satellite signals of the GPS satellites or the measured values acquired by the satellite navigation system 204 are affected by random, environmental interference. As long as this interference corresponds in terms of its extent and frequency to white noise, its plausibility is verified. However, since the interference frequently does not correspond to white noise, e.g. in the case of multipath propagation, a further plausibility verification concept is additionally used. This concept provides the use of further existing redundancies for the plausibility verification of the measured values acquired or defined by the satellite navigation system 204. The measured values defined by means of the inertial sensor navigation system 201 are therefore used in order to verify the plausibility of the measured values of the satellite navigation system 204. If the plausibility of these measured values cannot be verified, the corresponding measured values are rejected and not further processed. The plausibility verification is carried out via a comparison of the measured values of which the plausibility is to be verified, i.e. the position and speed defined by the satellite navigation system 204 with the positions and speeds defined by the inertial sensor navigation system 201, wherein the respective measurement uncertainties or error values are taken into account and threshold values are used for the comparison. The positions and speeds defined by the inertial sensor navigation system 201 are fed by the fusion filter 205 to the plausibility verification module 209. The measured values verified by the plausibility verification module 209 are then output to the fusion filter 205.

The system furthermore comprises a preprocessing unit 210 of the odometry navigation system 203 which receives, as sensor signals via the CAN bus, the measured values acquired by the odometry navigation system 203. In this case, the acquired measured values are the measured values of the individual wheel rotational speed sensors and the measured values of the steering angle sensor. From the measured values or sensor signals output by the odometry navigation system 203, the preprocessing unit 210 then defines the position and alignment of the motor vehicle in the GPS coordinate system according to a dead reckoning method. The preprocessing unit 210 furthermore corrects the measured values or sensor signals received from the optometry navigation system 203 by means of correction values received from the fusion filter 205.

A plausibility verification module 211 which verifies the plausibility of the measured values, i.e. the individual speeds of the wheels of the motor vehicle, output by the preprocessing unit 210, is furthermore assigned to the odometry navigation system 203. For the plausibility verification, it is assumed that the measured values acquired by the odometry navigation system 203 are also affected by random, environmental interference. If these measured values correspond in terms of their statistical behavior to white noise, the plausibility is verified. However, since the interference of the measured values from the odometry navigation system 203 frequently does not correspond to white noise, e.g. in the case of a comparatively substantial wheel slip, a further plausibility verification concept is used in addition here also, i.e. the use of further existing redundancies. The measured values defined by means of the inertial sensor navigation system 201 are therefore used in order to verify the plausibility of the measured values from the odometry navigation system 203. If the plausibility of these measured values cannot be verified, the corresponding measured values are rejected and not further processed. The plausibility verification is carried out via a comparison of the measured values of which the plausibility is to be verified. The respective measurement uncertainties and error values are taken into account here and threshold values are used for the comparison. The measured values defined by the inertial sensor navigation system 201 are fed by the fusion filter 205 to the plausibility verification module 211. The measured values of which the plausibility is verified by the plausibility verification module 211 are output as corrections to the fusion filter 205.

The elements consisting of the preprocessing unit 210 of the odometry navigation system 203 and the plausibility verification module 211, and also the elements consisting of the preprocessing unit 208 of the satellite navigation system 204 and the plausibility verification module 209, with proportional incorporation of the fusion filter 205, in each case form what is known as a "tightly coupling loop".

According to the example, the fusion filter 205 is designed as an error state space Kalman filter and forms the core piece of the system shown by way of example. The fusion filter 205 continuously defines a deviation of the measured values acquired by the odometry navigation system 203 and the satellite navigation system 204 from precalculated reference values, wherein the fusion filter 205 defines the associated error values from the deviation and—directly or indirectly—performs corrections of the measured values. To do this, the fusion filter 205 represents, in terms of control technology, what is referred to as an observer. According to the example, however, the main task of the fusion filter 205 is to correct the measured values of the basic system, i.e. of the inertial navigation system 201, by means of correction values defined from measured values from the odometry navigation system 203 and the satellite navigation system 204 which represent the correction systems, and to output these corrections to the strapdown algorithm unit 207. To do this, the speeds and accelerations of the individual wheels and the rotational speed and the rotational acceleration of the motor vehicle are defined by the fusion filter 205 in the vehicle coordinate system on the basis of the measured values from the odometry navigation system 203. Furthermore, the position and speed are defined in the GPS coordinate system by the fusion filter 205 on the basis of the measured values from the satellite navigation system 204.

Since the inertial navigation system 201 has the shortest signal output delays and the highest sampling rate according to the example, the fusion filter 205 receives comparatively many sensor signals from the inertial navigation system 201, whereas the fusion filter 205 receives comparatively few sensor signals from the odometry navigation system 203 and the satellite navigation system 204. As described, the sensor signals are transmitted still in the form of raw data to the fusion filter 205. Due to the aforementioned different signal output delays, the sensor signals from the inertial navigation system 201 are stored over a time period of 25 measuring epochs in an electronic data memory (not shown). This time period essentially corresponds to the difference between the shortest signal output delay and the longest signal output delay. According to the example, the satellite navigation system 204 has the longest signal output delay. It is thus ensured that, for the sensor signals from both the odometry navigation system 203 and from the satellite navigation system 204, sensor signals from the inertial navigation system 201 with an identical timestamp are always present, since only sensor signals with an identical timestamp are compared. The error values are also defined by means of this comparison.

Since the sensor signals from the odometry navigation system 203 and from the satellite navigation system 204 similarly have different signal output delays, the corrections and the definition of the error values are carried out on the basis of sensor signals from the odometry navigation system 203 according to the example at times differing from those of the corrections and the definition of the error values on the basis of the satellite navigation system 204. In order to detect a correction already performed or an error value already defined and to avoid a repeated application of a correction which would result in the generation of a new error, the corrections already performed are taken into account in the application of further corrections. The corrections already performed are taken into account in such a way that the previously performed corrections, such as, according to the example, all corrections, are applied not only to the current measured values or error values of the inertial navigation system 201, but also to the stored measured values. The measured values corrected in this way—both the current and the stored values—therefore contain the applied corrections. Since these measured values containing the applied corrections are later used to define the new error values, the previously applied corrections are therefore taken into account via the already corrected measured values.

The following simple example additionally describes an alternative embodiment of the method according to the invention. At a first time $t_1$, the inertial navigation system 201 defines a position of the motor vehicle which lies one meter too far to the left of the actual position of the motor vehicle. This error is then detected slightly later at the time $t_2$ by means of a comparison with the measured values of the odometry navigation system 203. An error value which describes that the defined position lies one meter too far to the left of the actual position of the motor vehicle is defined accordingly at the time $t_2$. The correction is performed immediately thereafter in order to compensate for the detected error value. At a further later time $t_3$, the position of the motor vehicle defined from the measured values from the satellite navigation system 204 is then also present for the fusion filter 205. Although the measured data from the inertial navigation system 201, the odometry navigation system 203 and the satellite navigation system 204 were all acquired at the same time, they are present for the fusion filter 205 only later and at the aforementioned different times $t_1$, $t_2$ and $t_3$ due to the different signal output delays. In the ensuing comparison of the measured values from the inertial navigation system 201 with the measured values from the satellite navigation system 204, it is again detected that the position of the motor vehicle defined by the inertial navigation system 201 lies one meter too far to the left of the actual position of the motor vehicle. A further correction of this error by the measured values from the satellite navigation system 204 would then have the result that the position defined by the system would deviate one meter to the right of the actual position of the motor vehicle. In order to avoid this error, the corrections are taken into account over the time period of 25 measuring epochs according to the example, i.e. they are monitored according to the example by means of a microprocessor. The microprocessor then detects that an identical correction has already been applied, that the detected error has therefore already been corrected, and therefore suppresses the repeated application.

Since the fusion filter 205 is an error state space Kalman filter, only the error values of the measured values are defined and corresponding corrections are performed. This simplifies and speeds up the fusion, carried out by the fusion filter 205, of the measured values from the inertial navigation system 201, the odometry navigation system 203 and the satellite navigation system 204 into a common fusion data set. A real-time-capable position definition and correction of the position definition are thus enabled.

The system shown in FIG. 2 represents a virtual sensor, wherein, however, the inertial navigation system 201, the odometry navigation system 203 and the satellite navigation system 204 are not components of the virtual sensor. A virtual sensor is a system which always generates the same output data or outputs irrespective of the type of the incorporated sensor systems, i.e. here the inertial navigation system 201, the odometry navigation system 203 and the satellite navigation system 204. From the output data or outputs, it is not evident which sensor systems are incorporated into the system.

Figure 3:
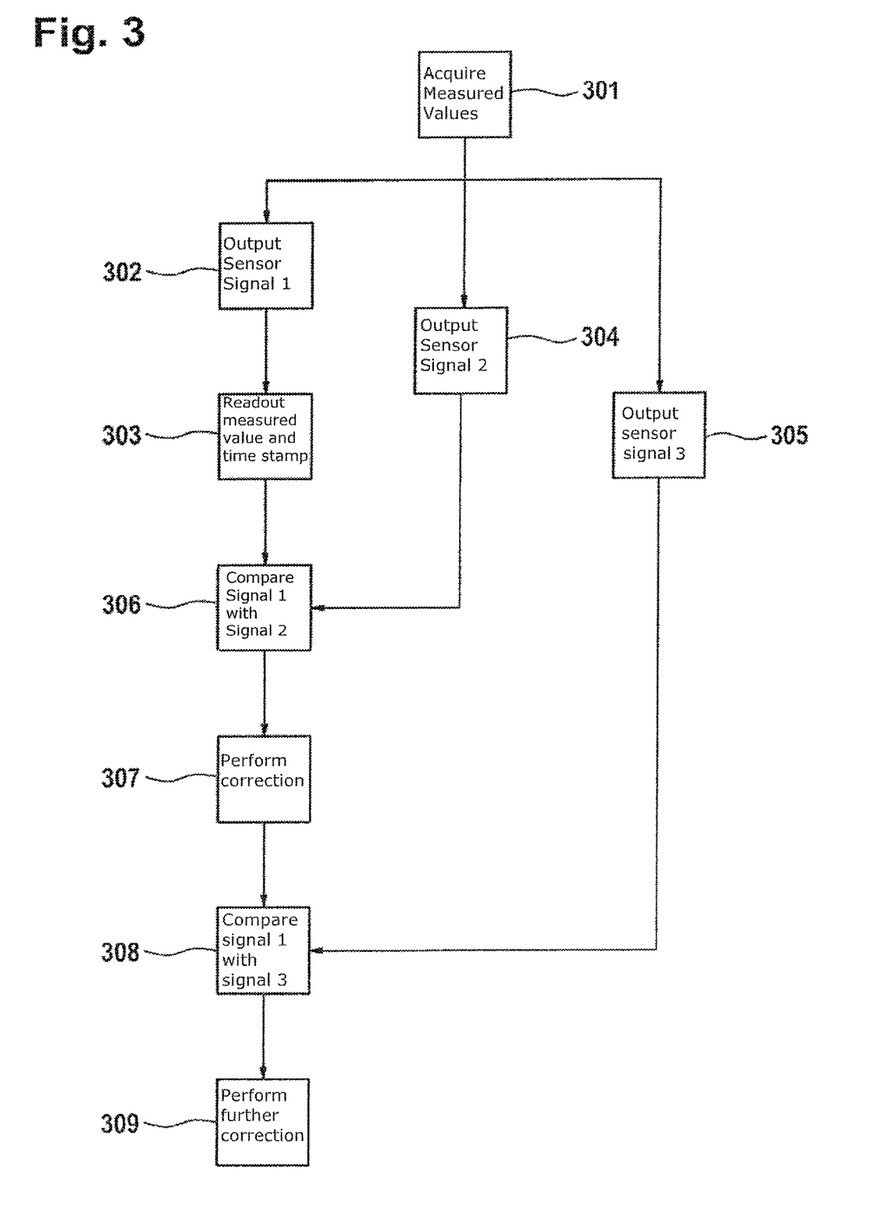
FIG. 3 shows a possible sequence of a method according to the invention in the form of a flow diagram.

FIG. 3 shows a possible sequence of a method according to an aspect of the invention in the form of a flow diagram. In method step 301, three different measured values are acquired from three different sensor systems, i.e. from the sensor system 1, the sensor system 2 and the sensor system 3. All three sensor systems measure one and the same physical quantity, but by means of different operating principles. In method step 302, the sensor system 1, which has the shortest signal output delay, outputs a sensor signal describing the measured value acquired by the sensor system 1 in step 301. In step 303, this sensor signal is acquired by a fusion filter which reads out the measured value described by the sensor signal and the timestamp. The fusion filter assumes that the most recently defined error value still applies unchanged and performs a corresponding correction on the measured value. Shortly thereafter, in method step 304, the sensor system 2 which has the second shortest signal output delay outputs a sensor signal describing the measured value acquired by the sensor system 2 in step 301. Finally, in method step 305, the sensor system 3 which, according to the example, has the longest signal output delay, also outputs a sensor signal describing the measured value acquired by the sensor system 3 in step 301. The signals output by the sensor systems 1, 2, and 3 in each case comprise a timestamp which comprises the acquisition time of the measured value described by the respective sensor signal. The timestamp is identical for all three sensor signals or measured values, since all three measured values were acquired at an identical time, i.e. in method step 301. In step 306, a comparison is carried out between the measured value from the sensor system 1 and the measured value from the sensor system 2. Since the measured value from the sensor system 1 was already output before the measured value from the sensor system 2, the measured value from the sensor system 1 was retained in an electronic data memory in order then to be able to use it for the comparison. It is thus ensured that only measured values with an identical timestamp are compared with one another. The result of the comparison in step 306 is that the measured value from the sensor system 1 has an error. The corresponding value of the error, i.e. the error value, is similarly defined in step 306. In step 307, a correction corresponding to the error value is performed on the measured value from the sensor system 1 retained in the electronic data memory. In step 307, all further measured values from the sensor system 1 retained in the electronic data memory are similarly corrected according to the error value defined in step 306. In addition, all currently output measured values or sensor signals are corrected in step 307 according to the error value defined in step 306. In step 308, a comparison between the measured value from the sensor system 1 and the measured value from the sensor system 3 is performed. Since the measured value from the sensor system 1 was also output before the measured value from the sensor system 3, the measured value from the sensor system 1, as described, was retained in an electronic data memory in order to be able to use it also for this comparison. It is thus ensured here also that measured values with an identical timestamp are compared with one another. The result of the comparison in step 308 is then that the measured value from the sensor system 1 still has an error, despite the correction already applied in step 307. The then resulting error value for the measured value already corrected in step 307 is therefore also defined in step 308. The error value defined in step 308 thus designates the value of an error which is still present even after the correction carried out in step 307. In step 309, a further correction of the already corrected measured value from the sensor system 1 from step 301 is then performed.

The corrections carried out in each case build on one another according to the example and, in a manner of speaking, represent a summed total error which is added to the measured value for the correction.

The method sequence described by way of example is a continuously running process wherein, in particular, the sensor systems 1, 2 and 3 constantly output new sensor signals, while the previously output sensor signals or measured values are still being partially preprocessed by the fusion filter.

A constant correction of the measured values similarly takes place. Since the respective currently output measured values are also already provided with the sum of all previous corrections or offset values, a constant further correction is thus carried out. The respective current correction takes into account the corrections already previously applied by further correcting the already corrected measured values.

According to a further example embodiment (not shown), an error state space Kalman filter carries out the form of the method according to the invention described below. To do this, the following examples of assumptions are made:
1. Within the temporal duration τ, the errors of the measured values X in the strapdown algorithm are constant and independent from the measured values. Within the time period τ, depending on the sampling rate $f_{IMU}$ of the basic system, n measured values are retained in the memory:

$$n = \tau \cdot f_{IMU}$$

2. If assumption (1) is valid, a separation within τ of the n stored measured values $X_n$ from the past corrected by the currently known error into true operating points $S_n$ and residual errors $\vec{\varepsilon}$ independent therefrom is permissible. Since the error values are assumed as constant, they are identical to the error value of the current measuring epoch and can be correctly described by the associated variances of the error state space Kalman filter:

$$X_n = S_n + \varepsilon$$

3. In each case between two consecutive sampling steps of the filter, all changes in the measured values are to be described as approximately proportional to the time period.
4. The difference $t_d$ in the signal output delays between the basic system and the correction systems is generally known or measurable.

The error state space observation vector $\vec{z}$ which describes the error values of the basic system is then obtained as the difference between the correction measurement and the measurement of the basic system. If assumption (1) applies, an error value determined around $t_d$ in the past is applied provided that $t_d \leq \tau$ applies, without losses of accuracy in the latest, present measuring epoch or in the latest, present measuring cycle. A storage of the measured values of the basic system used to calculate $\vec{z}$ within the time period τ is sufficient for the virtual measurement in the past.

During the signal output delay of a sensor system, corrections by measured values of other sensor systems already take place in each case with different signal output delays. In order to retain assumption (2), the correction of the error ε valid for all stored measured values $X_n$ takes place in a correction of the current measured values by the error increments $\vec{x}$ calculated by the filter. It is thus ensured that only the error value of the current measured values is always corrected, regardless of the respective signal output delay.

Since a measured value $X_m$ always contains the summed correction increments $\vec{\varepsilon}_0$ known at this time, the following applies to the update of the associated correction $\vec{\varepsilon}$, e.g.:

$$\vec{\varepsilon} = \vec{\varepsilon}_0 + \sum_{s=0}^{s=m} \vec{x}_s$$

This allows a computing-time-efficient, recursive implementation as a summation of the corrections $\vec{x}$ calculated by the error state space Kalman filter in each case on all stored measured values $X_n$.

Since synchronous sampling of the basic system and correction measurements is not generally assumed, i.e. the basic system and the correction system have different signal output delays, under assumption (3) a linear interpolation of the measured values $X_k$ required in order to define the error values is carried out. Under assumption (4), the delay time $t_d$ is preferably used in order to select the two measured values $X_i$ and $X_j$ of the basic system closest to this time or timestamp and including this time or timestamp. $t_i \leq t_d \leq t_j$ applies here. A linear interpolation then takes place between the measured values according to:

$$X_k = X_i + (X_j - X_i) \cdot \frac{t_d - t_i}{t_j - t_i}$$

The values $X_k$ corrected by the currently known errors and interpolated onto the required timestamp are then compared with the further correction measurements, i.e. with the with the measured values of the correction systems.

The invention claimed is:
1. A method for fusing sensor signals with different temporal signal output delays into a fusion data set, the method comprising:
receiving, by a processor in a vehicle, a different sensor signal from at least three different sensor systems in the vehicle, wherein each different sensor signal in each case describes a differently measured value of a common physical characteristic of the vehicle, wherein a signal output delay of each different sensor signal is individual to each different sensor system, and each different sensor signal in each case includes a timestamp describing an acquisition time of the measured values,
wherein a first sensor system of the at least three different sensor systems has a first output signal delay, a second sensor system of the at least three different sensor systems has a second output signal delay, and a third sensor system of the at least three different sensor systems has a third output signal delay, wherein the first output signal delay and the second output signal delay are smaller than the third output signal delay;
correcting, by the processor, the measured values of a first sensor system of the at least three different sensor systems by:
1) determining a first error value of the measured values of the first sensor system by comparing the measured values with measured values of the second sensor system when they become available after the second output signal delay, wherein measured values with an identical timestamp are used for the comparison, and wherein the first error value is assumed as constant at least for the time period between two consecutive comparisons,
2) correcting the measured values of the first sensor system with the first error value,

3) retaining the first error value and/or the measured values of the first sensor system for a specified time period,
4) determining a second error value of the measured values of the first sensor system by comparing the corrected measured values with measured values of the third sensor system when they become available after the third output signal delay, and
5) correcting the corrected measured values of the first sensor system with the second error value; and controlling, by the processor, the vehicle based on the corrected measured values of the first sensor system in step 5.

2. The method as claimed in claim 1, wherein the first sensor system has a comparatively shortest signal output delay.

3. The method as claimed in claim 1, wherein the retained first error value and/or the retained measured values are corrected.

4. The method as claimed in claim 1, wherein the corrections are offset against one another during the time period.

5. The method as claimed in claim 1, wherein the corrections are carried out based on measured values of the further sensor systems.

6. The method as claimed in claim 1, wherein the sensor signals are filtered before being used for the fusion.

7. The method as claimed in claim 1, wherein the sensor signals are sensor signals of an inertial navigation system, sensor signals of a global satellite navigation system and sensor signals of an odometry navigation system.

8. The method as claimed in claim 1, wherein the first error value is defined by an error state space filter.

9. The method as claimed in claim 1, wherein measured values with a required timestamp are generated by interpolation for defining the first error value if no measured values with an identical timestamp are present.

10. The method as claimed in claim 9, wherein changes in the measured values are assumed as proportional to time for the interpolation.

11. The method as claimed in claim 1, wherein the first error value and the second error value are defined for the measured values of all sensor systems.

12. A fusion filter for fusing sensor signals with different temporal signal output delays into a fusion data set, including:
a processor configured to:
acquire a different sensor signal from at least three different sensor systems in the vehicle, each different sensor signal in each case describes a differently measured value of a common physical characteristic of the vehicle,
wherein a signal output delay of each different sensor signal is individual to each different sensor system,
wherein each different sensor signal in each case includes a timestamp describing an acquisition time of the measured values,
wherein a first sensor system of the at least three different sensor systems has a first output signal delay, a second sensor system of the at least three different sensor systems has a second output signal delay, and a third sensor system of the at least three different sensor systems has a third output signal delay,
wherein the first output signal delay and the second output signal delay are smaller than the third output signal delay,
correct the measured values of a first sensor system of the at least three different sensor systems by:
1) determining a first error value of the measured values of the first sensor system by comparing the measured values with measured values of the second sensor system when they become available after the second output signal delay, wherein measured values with an identical timestamp are used for the comparison, and wherein the first error value is assumed as constant at least for the time period between two consecutive comparisons,
2) correcting the measured values of the first sensor system with the first error value,
3) retaining the first error value and/or the measured values of the first sensor system for a specified time period,
4) determining a second error value of the measured values of the first sensor system by comparing the corrected measured values with measured values of the third sensor system when they become available after the third output signal delay, and
5) correcting the corrected measured values of the first sensor system with the second error value, and control the vehicle based on the corrected measured values of the first sensor system in step 5.

13. A system for fusing sensor signals with different temporal signal output delays into a fusion data set, comprising at least three different sensor systems which output sensor signals describing measured data with signal output delays individual to each sensor, wherein the system furthermore comprises a fusion filter as claimed in claim 12.

14. The system as claimed in claim 13, wherein the system carries out a method for fusing the sensor signals with the different temporal signal output delays into the fusion data set, wherein at least three different sensor signals in each case describe a measured value of the at least three different sensor systems, wherein the signal output delays are individual to each sensor, wherein the sensor signals in each case comprise a timestamp describing an acquisition time of the measured values, wherein first error value of measured values of a first sensor system are defined by a comparison with measured values of further sensor systems, wherein measured values with an identical timestamp are used for the comparison, wherein the first error value is assumed as constant at least for the time period between two consecutive comparisons, and wherein the first error value and/or the measured values of the first sensor system are retained for a specified time period, wherein the first error value and/or the measured values of the first sensor system are continuously corrected by a correction, wherein corrections carried out during the time period are taken into account in an application of further corrections during the time period.

15. A use of the system as claimed claim 13 in a motor vehicle.

16. The method as claimed in claim 2, wherein the retained first error value and/or the retained measured values are corrected.

17. The method as claimed in claim 1, wherein, the first error value is defined by an error state space Kalman filter.

* * * * *